(12) United States Patent
Kim et al.

(10) Patent No.: US 11,588,593 B2
(45) Date of Patent: Feb. 21, 2023

(54) METHOD AND DEVICE FOR TRANSMITTING AND RECEIVING REFERENCE SIGNAL FOR POSITIONING

(71) Applicant: IUCF-HYU (INDUSTRY-UNIVERSITY COOPERATION FOUNDATION HANYANG UNIVERSITY), Seoul (KR)

(72) Inventors: Sun Woo Kim, Seoul (KR); Yong Min Song, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 28 days.

(21) Appl. No.: 15/734,608

(22) PCT Filed: Apr. 10, 2020

(86) PCT No.: PCT/KR2020/004869
§ 371 (c)(1),
(2) Date: Dec. 3, 2020

(87) PCT Pub. No.: WO2020/209655
PCT Pub. Date: Oct. 15, 2020

(65) Prior Publication Data
US 2021/0234650 A1    Jul. 29, 2021

(30) Foreign Application Priority Data

Apr. 12, 2019 (KR) .................. 10-2019-0043208
Jun. 27, 2019 (KR) .................. 10-2019-0077357
Apr. 3, 2020 (KR) .................. 10-2020-0041064

(51) Int. Cl.
*H04L 5/00* (2006.01)
*H04W 4/029* (2018.01)
(Continued)

(52) U.S. Cl.
CPC .......... *H04L 5/0048* (2013.01); *H04W 4/029* (2018.02); *H04W 24/02* (2013.01); *H04W 64/00* (2013.01); *H04W 72/0453* (2013.01)

(58) Field of Classification Search
CPC .. H04W 24/02; H04W 64/00; H04W 72/0453
See application file for complete search history.

(56) References Cited

U.S. PATENT DOCUMENTS

2014/0073356 A1*   3/2014   Siomina ................ H04W 4/029
                                                        455/456.2
2018/0049151 A1*   2/2018   Yoon ..................... H04L 5/0048
(Continued)

FOREIGN PATENT DOCUMENTS

KR   10-2018-0018237 A    2/2018
WO       2012-111937 A2    8/2012

OTHER PUBLICATIONS

Nokia, 'Views on DL and UL reference signals for NR Positioning', R1-1905262, 3GPP TSG RAN WG1 #96bis, Xi'an, China, Apr. 2, 2019 See sections 2.1.6; and figure 1-2.
(Continued)

*Primary Examiner* — Joshua L Schwartz

(57) ABSTRACT

Embodiments relate to a method and device for transmitting and receiving sidelink HARQ feedback information. An embodiment relates to a method of receiving, by user equipment, a positioning reference signal (PRS). The user equipment receives configuration information regarding a PRS resource, which is used in reception of a PRS, from a base station, configures the PRS resource for the user equipment in accordance with the configuration information,
(Continued)

and receives the PRS from the base station via the PRS resource.

9 Claims, 16 Drawing Sheets

(51) Int. Cl.
*H04W 24/02* (2009.01)
*H04W 64/00* (2009.01)
*H04W 72/04* (2009.01)
*H04W 72/0453* (2023.01)

(56) References Cited

U.S. PATENT DOCUMENTS

2020/0236644 A1* 7/2020 Gunnarsson ........... H04W 64/00
2021/0105156 A1* 4/2021 Chuang ................ H04L 27/2607
2021/0242994 A1* 8/2021 Bi ......................... H04W 72/04

OTHER PUBLICATIONS

'3GPP; TSG RAN; Study on NR positioning support (Release 16)', 3GPP TR 38.855 V16.0.0, Mar. 28, 2019. See sections 9.1.1.
Mitsubishi Electric, 'Views on reference signal designs for NR positioning', R1-1904600, 3GPP TSG RAN WG1 Meeting #96b, Xi'an, China, Mar. 29, 2019. See sections 2.
International Search Report issued in PCT Application No. PCT/KR2020/004869. dated Jul. 10, 2020.

* cited by examiner

METHOD AND DEVICE FOR TRANSMITTING AND RECEIVING REFERENCE SIGNAL FOR POSITIONING

CROSS-REFERENCE TO RELATED APPLICATIONS

This application is a National Stage Entry of PCT International Application No. PCT/KR2020/004869, which was filed on Apr. 10, 2020, and which claims priority from and the benefit of Korean Patent Application Nos. 10-2019-0043208, filed with the Korean Intellectual Property Office on Apr. 12, 2019, 10-2019-0077357, filed with the Korean Intellectual Property Office on Jun. 27, 2019, and 10-2020-0041064, filed with the Korean Intellectual Property Office on Apr. 3, 2020, all of which are hereby incorporated by reference for all purposes as if fully set forth herein. In addition, when this application also claims priority for countries other than the United States for the same reason as above, all of the contents of the above-listed applications are hereby incorporated by reference.

TECHNICAL FIELD

The present disclosure relates to a method and device for positioning user equipment in a next generation wireless access network.

BACKGROUND ART

As a greater amount of communication traffic is required along with the development of technology, a next generation 5G communications system, i.e. a broadband wireless communications system improved from an existing long-term evolution (LTE) system, is required. In the next generation 5G system, also referred to as new radio access technology (NR or New RAT), enhanced mobile broadband (eMBB) communications, massive machine type communications (mMTC), and ultra-reliable and low-latency communications (URLLC) have been proposed. In order to meet requirements for respective scenarios of use, designing a frame structure more flexible than the LTE system is required.

That is, NR needs to be designed so as to meet not only data transmission rates improved as compared to those of LTE but also a variety of requirements according to specified scenarios of use.

With such demand, in NR, a flexible design is required for a positioning reference signal (PRS) so as to be able to support a variety of scenarios of use regarding the positioning of user equipment.

DISCLOSURE

Technical Problem

Embodiments of the present disclosure may provide a specific method and device able to flexibly configure a positioning reference signal (PRS) resource used for the transmission and reception of a PRS in new radio access technology (NR).

The objectives of the present disclosure are not limited to the aforementioned description, and other objectives not explicitly disclosed herein will be clearly understood by those having ordinary knowledge in the technical field, to which the present disclosure pertains, from the description provided hereinafter.

Technical Solution

According to an embodiment of the present disclosure, provided is a method of receiving, by user equipment, a PRS. The method may include: receiving configuration information regarding a PRS resource, which is used in reception of a PRS, from a base station; configuring the PRS resource for the user equipment in accordance with the configuration information; and receiving the PRS from the base station via the PRS resource. The configuration information may include a PRS identifier regarding the PRS resource, a PRS sequence, frequency domain allocation information, time domain allocation information, and information regarding a comb size.

According to another embodiment of the present disclosure, provided is a method of transmitting, by a base station, a PRS. The method may include: configuring configuration information regarding a PRS resource used in transmission of a PRS; and transmitting the configuration information regarding the PRS resource to user equipment via the PRS resource. The configuration information may include a PRS identifier regarding the PRS resource, a PRS sequence, frequency domain allocation information, time domain allocation information, and information regarding a comb size.

According to further another embodiment of the present disclosure, user equipment for receiving a PRS. The user equipment may include: a receiver receiving configuration information regarding a PRS resource, which is used in reception of a PRS, from a base station and receiving the PRS via the PRS resource; and a controller configuring the PRS resource regarding the user equipment in accordance with the configuration information. The configuration information may include a PRS identifier regarding the PRS resource, a PRS sequence, frequency domain allocation information, time domain allocation information, and information regarding a comb size.

Advantageous Effects

According to embodiments of the present disclosure, a specific method and device able to flexibly configure a PRS resource used for the transmission and reception of a PRS in NR may be provided.

The effects obtainable from the present disclosure are not limited to the aforementioned description, and other effects not explicitly disclosed herein will be clearly understood by those having ordinary knowledge in the technical field, to which the present disclosure pertains, from the description provided hereinafter.

BEST MODE

Figure 1:
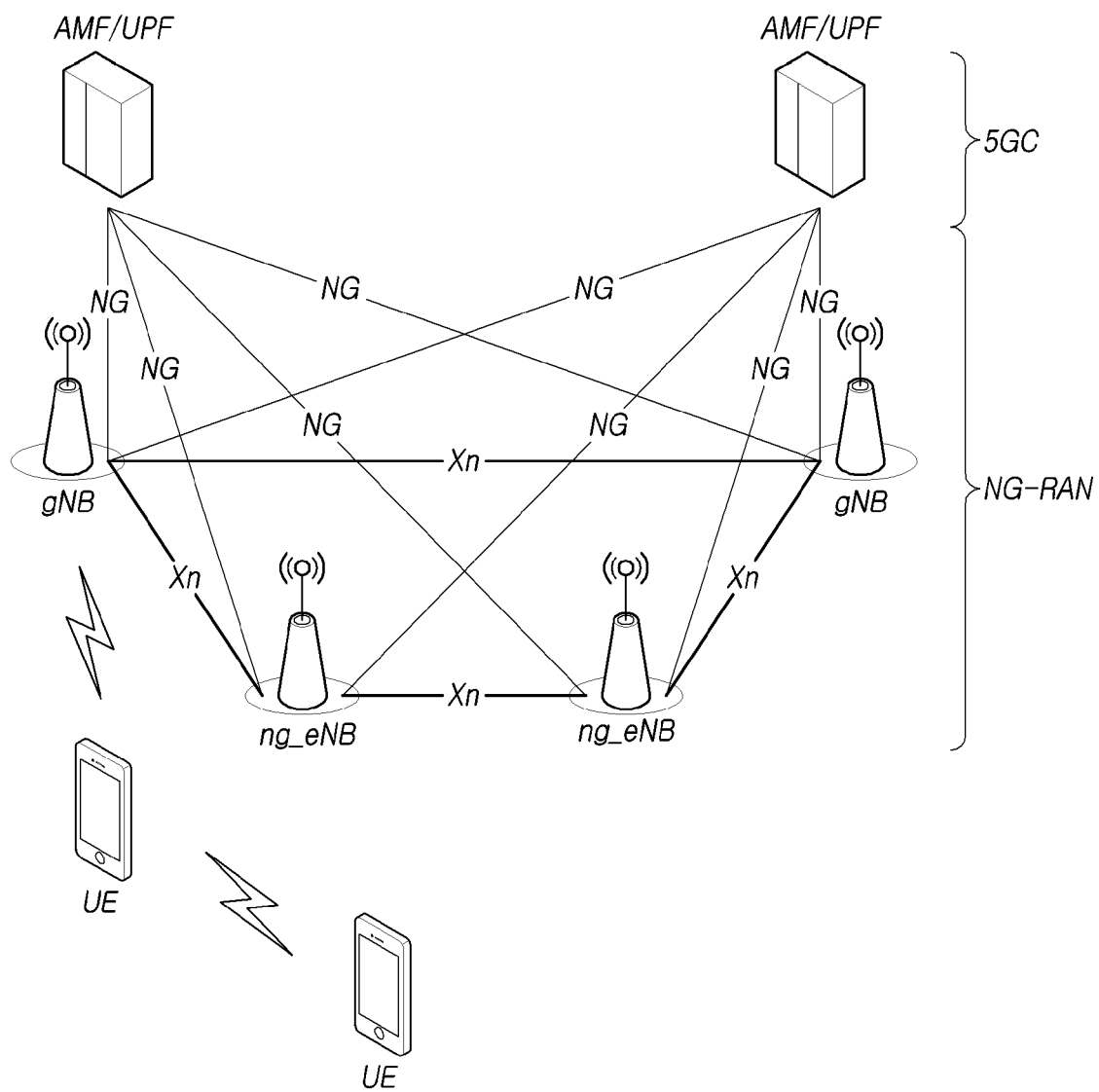
FIG. 1 is a diagram schematically illustrating a structure of an NR wireless communications system related to embodiments of the present disclosure.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted in the situation in which the subject matter of the present disclosure may be rendered rather unclear thereby.

In addition, terms, such as first, second, A, B, (a), (b) or the like may be used herein when describing components of the present disclosure. These terminologies are not used to define an essence, order, sequence, or number of corresponding components but used merely to distinguish the corresponding components from other components. In the case that it is described that a certain element "is connected to", "is coupled to", or "is in contact with" another element, it should be interpreted that another element may "be connected to", "be coupled to", or "be in contact with" the structural element.

In addition, it should be understood that terms and technical words used herein are merely used to describe a particular embodiment and are not intended to limit the technical concepts disclosed in this specification. All terms used herein may be construed as having the same meaning as commonly understood by those having ordinary knowledge in the technical field, to which the present disclosure pertains. When such a technical term used herein is an incorrect technical term failing to exactly express the technical concepts disclosed in this specification, the technical term should be replaced by a technical term that those having ordinary knowledge may correctly understood. Further, the general terms used herein should be construed as the definition used in dictionaries or in accordance with the context, and should not be construed as having an excessively reduced meaning.

The term "wireless communications system" used herein refers to a system providing a range of communication services, including voice and packet data, using radio resources (or wireless resources). Such a wireless communications system may include user equipment, a base station, and a core network.

Embodiments disclosed hereinafter may be used in wireless communications systems using a range of wireless access technologies. For example, embodiments may be used in a range of wireless access technologies, such as code division multiple access (CDMA), frequency division multiple access (FDMA), time division multiple access (TDMA), orthogonal frequency division multiple access (OFDMA), or single carrier frequency division multiple access (SC-FDMA). CDMA may be realized by a wireless technology, such as universal terrestrial radio access (UTRA) or CDMA2000. TDMA may be realized by a wireless technology, such as the global system for mobile communications (GSM), general packet radio service (GPRS), or enhanced data rates for GSM evolution (EDGE). OFDMA may be realized by a wireless technology, such as institute of electrical and electronics engineers (IEEE) 802.11 (Wi-Fi), IEEE 802.16 (WiMAX), IEEE 802-20, or evolved-UMTS terrestrial radio access (E-UTRA, where UMTS is short for universal mobile telecommunications system). IEEE 802.16m, evolved from IEEE 802.16e, provides backward compatibility with systems based on IEEE 802.16e. UTRA is a portion of UMTS. 3rd generation partnership project (LTE) long term evolution (3GPP) is a portion of evolved UMTS (E-UMTS) using E-UTRA, and uses OFDMA in downlinks and SC-FDMA in uplinks. In this manner, embodiments of the present disclosure may be used in wireless access technologies that are currently disclosed or commercially available or may be used in any wireless access technology currently being, or will be, developed.

In addition, the term "user equipment" used herein should be interpreted as having a comprehensive term referring to a wireless communications module that communicates with a base station in a wireless communications system, and should be interpreted as including not only user equipment in WCDMA, LTE, HSPA, IMT-2020 (5G or New Radio), and the like, but also all of a mobile station (MS), a user terminal (UT), a subscriber station (SS), a wireless device, and the like, used in GSM. In addition, the user equipment may refer to a user mobile device, such as a smartphone, depending on the type of use or may refer to a vehicle or a device including a wireless communications module in the vehicle in the vehicle-to-everything (V2X) communications system. Furthermore, in the machine type communications (MTC) system, the user equipment may refer to an MTC user equipment, a machine-to-machine (M2M) user equipment, or the like, provided with a communications module able to perform machine type communications.

The term "base station" or "cell" used herein refers to an end in a network, communicating with user equipment, and comprehensively indicates a variety of coverage areas, such as a node-B, an evolved node-B (eNB), a gNodeB (gNB), a low power node (LPN), a sector, a site, an antenna having a variety of shapes, a base transceiver system (BTS), an access point, a point (e.g. a communication point, a reception point, or a transmission/reception point), a relay node, a megacell, a macrocell, a microcell, a picocell, a femtocell, a remote radio head (RRH), a radio unit (RU), and a small cell. In addition, the cell may be understood as including a bandwidth part (BWP) configured in the user equipment. For example, a serving cell may refer to an activation BWP of the user equipment.

Since each of the variety of cells as stated above is controlled by a dedicated base station, the base station may be interpreted in two senses. Each of the base stations 1) may be an apparatus itself providing a megacell, a macrocell, a microcell, a picocell, a femtocell, or a small cell in relation to a wireless communication area, or 2) may indicate the wireless communication area itself. In 1), when apparatuses providing wireless areas are controlled by the same entity or apparatuses interact with one another to form a wireless area in a coordinated manner, all of such apparatuses may be referred to as base stations. The transmission/reception point, the transmission point, the reception point, and the like are examples of the base station, according to the configuration of the wireless area. In 2), the wireless area itself in which a signal is received or transmitted may be referred to as a base station, from the perspective of a user or an adjacent base station.

The term "cell" used herein may refer to a coverage of a signal transmitted from the transmission point or the transmission/reception point, a component carrier having the coverage of the signal transmitted from transmission point or the transmission/reception point, or the transmission point or the transmission/reception point.

Here, the term "uplink (UL)" refers to a data transmission/reception method by which data is transmitted from the user equipment to the base station, whereas the term "downlink (DL)" refers to a data transmission/reception method by which data is transmitted from the base station to the user equipment. The downlink may refer to communications or a communication path from a multiple transmission/reception point to the user equipment, whereas the uplink may refer to communications or a communication path from the user equipment to the multiple transmission/reception point. In the downlink, a transmitter may be a portion of the multiple transmission/reception point, whereas a receiver may be a portion of the user equipment. In addition, in the uplink, the transmitter may be a portion of the user equipment, whereas the receiver may be a portion of the multiple transmission/reception point.

The uplink and the downlink transmit and receive control information via a control channel, such as a physical downlink control channel (PDCCH) or a physical uplink control channel (PUCCH), and transmit and receive data by forming a data channel, such as a physical downlink shared channel (PDSCH) or a physical uplink shared channel (PUSCH). Hereinafter, transmitting or receiving a signal via a channel, such as the PUCCH, the PUSCH, the PDCCH, or the PDSCH, may also be described as "transmitting or receiving the PUCCH, the PUSCH, the PDCCH, or the PDSCH".

To clarify the description, the principle of the present disclosure will be described with respect to 3GPP LTE/LTE-A/NR (New RAT) communications system but the technical features of the present disclosure are not limited thereto.

In 3GPP, research on 5th generation (5G) communications technology for meeting requirements for next generation wireless access technology of the international telecommunication union radiocommunication sector (ITU-R) has been carried out. Specifically, in 3GPP, research on research on new NR communications technology separate from LTE advanced Pro (LTE-A Pro) and 4G telecommunications technology improved from LTE Advanced in accordance with the requirements of the ITU-R has been carried out. Both LTE-A Pro and NR are likely to be submitted as 5G communications technology, but, hereinafter, embodiments of the present disclosure will be described with reference to NR for the sake of brevity.

In NR, a variety of operation scenarios are defined by adding considerations regarding satellites, vehicles, new vertical services, and the like to in typical 4G LTE scenarios.

In terms of services, NR supports an enhanced mobile broadband (eMBB) scenario; a massive machine communication (MMIC) scenario having high user equipment density, deployed over a wide range, and requiring low data rates and asynchronous accesses; and an ultra-reliability and low latency communications (URLLC) scenario requiring high responsiveness and reliability and able to support high-speed mobility.

In order to meet the scenario described above, NR discloses a wireless communications system using technologies providing a new waveform and frame structure, providing a low latency, supporting ultrahigh frequency waves (mm-Wave), and providing forward compatibility. In particular, the NR system presents various technical changes in terms of flexibility in order to provide forward compatibility. Major technical features will be described hereinafter with reference to the drawings.

FIG. 1 is a diagram schematically illustrating a structure of an NR wireless communications system to which embodiments of the present disclosure are applicable.

Referring to FIG. 1, the NR system is divided into a 5G core network (5GC) part and an NR-RAN part. The NG-RAN includes gNodeBs (gNBs) and new generation evolved Node Bs (ng-eNBs) providing protocol ends of a user plane (SDAP/PDCP/RLC/MAC/PHY) and a control plane (or a radio resource control (RRC)) for user equipment UE. The gNBs are connected to each other, or the gNBs and the ng-eNBs are connected to each other via an Xn interface. The gNBs and the ng-eNBs are connected to each other via an NG interface in the 5GC. The 5GC may include an access and mobility management function (AMF) managing a control plane, such as user equipment access and mobility control, and a user plane function (UPF) managing a control function over user data. The NR system supports both a frequency range of 6 GHz or lower, i.e. frequency range 1 (FR1), and a frequency range of 6 GHz or higher, i.e. frequency range 2 (FR2).

The gNBs refer to base stations providing the NR user plane and control plane protocol ends to the user equipment, whereas the ng-eNBs refer to base stations providing evolved UMTS (E-UTRA) user plane and control plane protocol ends to the user equipment. The term "base station" used herein should be understood as comprehensively indicating the gNB and the ng-eNB, or may be used as separately indicating the gNB and the ng-eNB as required.

In NR, cyclic prefix orthogonal frequency-division multiplexing (CP-OFDM) waveforms using the cyclic prefix (CP) for downlink transmissions are used, and CP-OFDM or discrete Fourier transform spread (DFT-s)-OFDM is used for uplink transmissions. The OFDM technology has advantages in that the OFDM technology may be easily combined with a multiple-input multiple-output (MIMO) method, may have a high frequency efficiency, and may use a low-complexity receiver.

In addition, in NR, requirements for data rate, latency, coverage, and the like are different according to the above-described three scenarios. Thus, it is necessary to efficiently meet the requirements according to the scenarios through frequency bands of the NR system. In this regard, a technology for efficiently multiplexing a plurality of different numerology-based radio resources has been proposed.

Specifically, NR transmission numerology is determined on the basis of subcarrier spacing and the cyclic prefix (CP), and p values are exponential values of 2 on the basis of 15 kHz and are exponentially changed, as described in Table 1 below.

TABLE 1

| μ | Subcarrier Spacing | Cyclic Prefix | Supported for Data | Supported for Synchronization |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
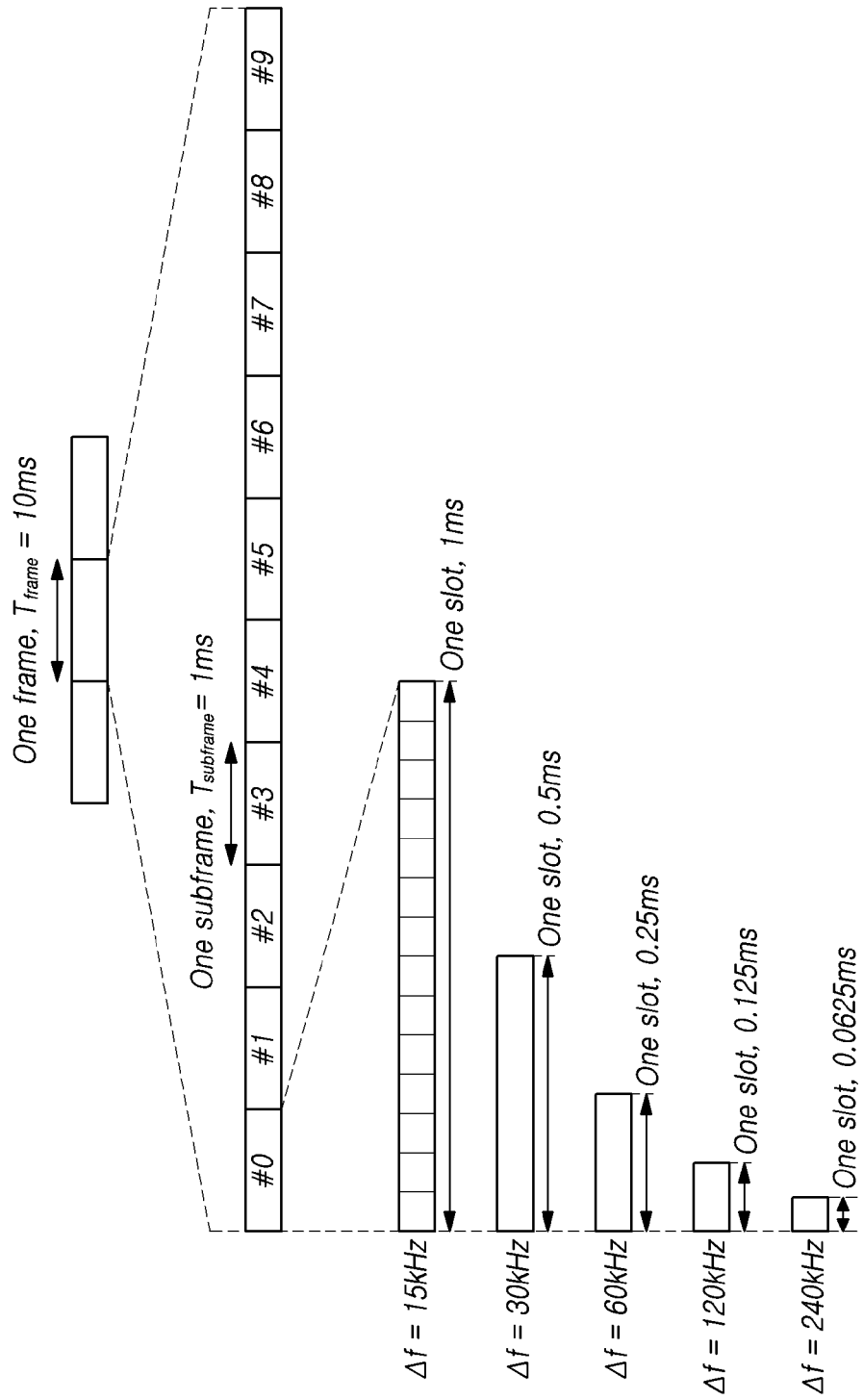
FIG. 2 is a diagram illustrating the frame structure in the NR wireless communications system related to embodiments of the present disclosure.

As described in Table 1 above, the numerology of NR may be divided into five types according to the subcarrier spacing. This differs from the feature of LTE, i.e. one of 4G communications technologies, in which the subcarrier spacing is fixed to 15 kHz. Specifically, in NR, the subcarrier spacings used for data transmissions are 15, 30, 60, and 120 kHz, and the subcarrier spacings used for synchronous signal transmissions are 15, 30, 12, and 240 kHz. In addition, an extended CP is only applied to 60 kHz subcarrier spacing. On the other hand, the frame structure in NR is defined as a frame having a length of 10 ms comprised of 10 subframes having the same lengths of 10 ms. A single frame may be divided into 5 ms half frames, each of which includes five subframes. In the case of 15 kHz subcarrier spacing, a single subframe comprises a single slot, and each slot comprises fourteen OFDM symbols. FIG. 2 is a diagram illustrating the frame structure in the NR system to which embodiments of the present disclosure are applicable. Referring to FIG. 2, the slot is constantly comprised of 14 OFDM symbols in the case of a normal CP, but the length of the slot may vary depending on the subcarrier spacing. For example, when the numerology has the 15 kHz subcarrier spacing, the length of the slot is 1 ms, identical to that of the subframe. Differently thereto, when the numerology has the 30 kHz subcarrier spacing, the slot may be comprised of 14 OFDM symbols and have 0.5 ms length, such that two slots may be included in a single subframe. That is, each of the subframe and the frame is defined having a fixed time length, and the slot may be defined by the number of symbols, such that the time length may vary depending on the subcarrier spacing. In addition, in NR, the slot is defined as a basic unit of the scheduling, and a mini-slot (or a sub-slot or a non-slot based schedule) is introduced in order to reduce a transmission delay in a wireless section. When a wide subcarrier spacing is used, the transmission delay in the wireless section may be reduced, since the length of a single slot is shortened in inverse proportion thereto. The mini-slot (or sub-slot) is devised to efficiently support URLLC scenarios and scheduling on the basis of 2, 4, or 7 symbols may be possible.

In addition, unlike LTE, NR defines uplink and downlink resource allocations as symbol levels in a single slot. In order to reduce hybrid automatic repeat request (HARQ) latency, a slot structure able to directly transmit at least one of an HARQ acknowledgement (HARQ ACK) or an HARQ negative acknowledgement (HARQ NACK) in a transmission slot is defined. In the description, this slot structure will be referred to as a self-contained structure.

NR is designed to support a total of 256 slot formats, of which 62 slot formats are used in Rel-15. In addition, various slot combinations support a common frame structure including an FDD, or a TDD frame. For example, NR supports a slot structure in which all symbols of the slot are configured as downlinks, a slot structure in which all symbols of the slot are configured as uplinks, and a slot structure in which downlink symbols and uplink symbols are combined. In addition, NR supports a form of scheduling in which data transmission is distributed in one or more slots. Accordingly, the base station may inform the user equipment of whether a corresponding slot is a downlink slot, an uplink slot, or a flexible slot, using a slot format indicator (SFI). The base station may indicate a slot format by indicating an index of a table, configured by user equipment-specific RRC signaling, using the SFI, dynamically using downlink control information (DCI), or statically or quasi-statically through the RRC.

Regarding the physical resources in NR, antenna ports, resource grids, resource elements (RE), resource blocks, bandwidth parts (BWPs), and the like may be considered.

The term "antenna port" is defined such that a channel carrying a symbol on an antenna port may be inferred from a channel carrying another symbol on the same antenna port. When the large-scale property of a channel carrying the symbol on one antenna port is inferable from a channel carrying a symbol on another antenna port, the two antenna ports may be in a quasi co-located or quasi co-location (QC/QCL) relationship. Here, the large-scale property includes at least one of a delay spread, a Doppler spread, a frequency shift, average received power, and received timing.

Figure 3:
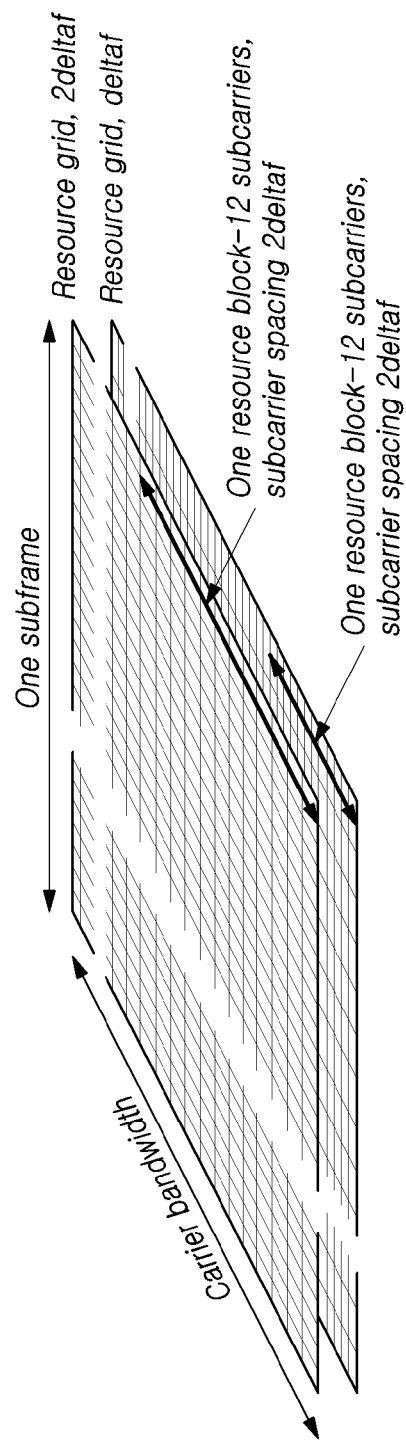
FIG. 3 is a diagram illustrating a resource grid supported by wireless access technology related to embodiments of the present disclosure.

FIG. 3 is a diagram illustrating a resource grid supported by wireless access technology to which embodiments of the present disclosure are applicable.

Referring to FIG. 3, since NR supports a plurality of numerologies in the same carrier, the resource grid may be present according to each numerology. In addition, the resource grid may be configured depending on the antenna port, the subcarrier spacing, and the transmission direction.

A resource block is comprised of 12 subcarriers and is only defined in a frequency domain. In addition, a resource element is comprised of one OFDM symbol and one subcarrier. Therefore, as shown in FIG. 3, the size of one resource block may vary depending on the subcarrier spacing. In addition, NR defines "point A" serving as a common reference point for a resource block grid, a common resource block, and a virtual resource block.

Figure 4:
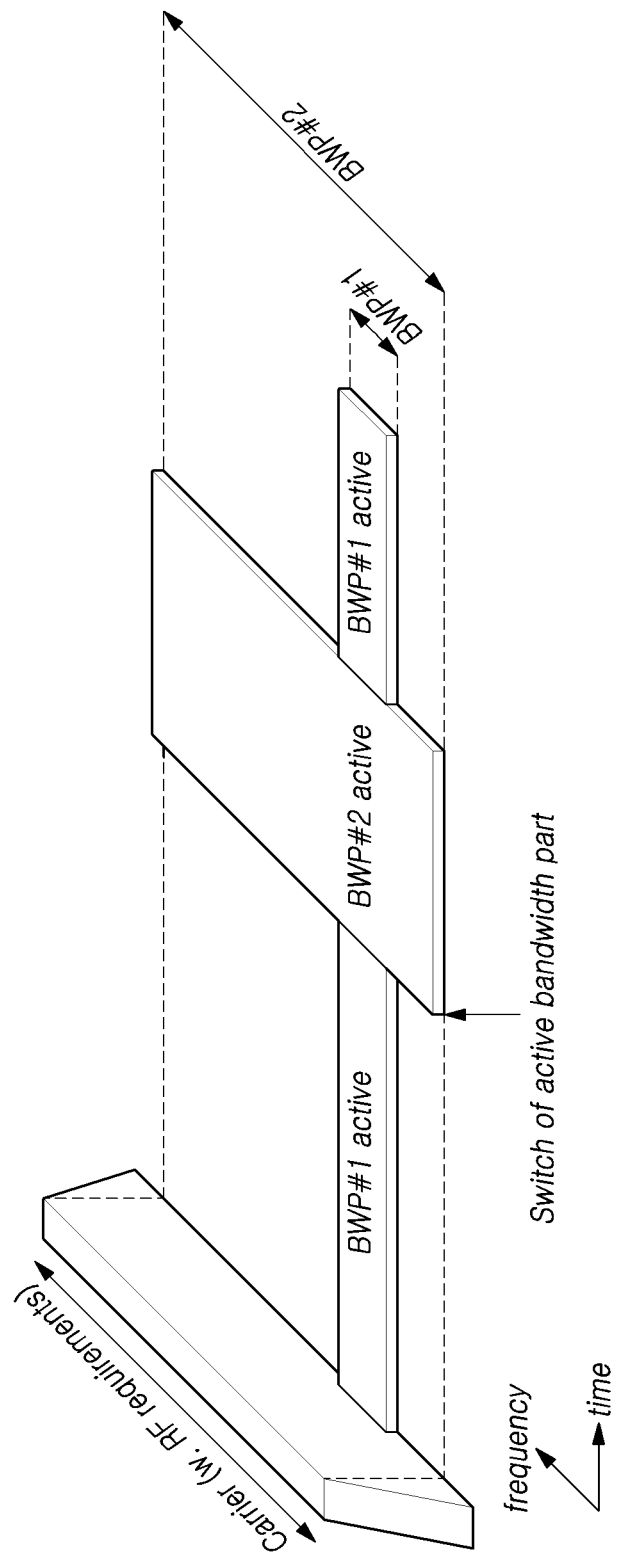
FIG. 4 is a diagram illustrating a BWP supported by wireless access technology related to embodiments of the present disclosure.

FIG. 4 is a diagram illustrating a BWP supported by wireless access technology to which embodiments of the present disclosure are applicable.

In the NR, the maximum carrier bandwidth is configured to be in the range from 50 MHz to 400 MHz depending on the subcarrier spacing, unlike in the LTE with the carrier bandwidth thereof being fixed to 20 MHz. Thus, it is not assumed that all user equipment uses all of these carrier bandwidths. Accordingly, as illustrated in FIG. 4, in NR, a bandwidth that each user equipment may use may be designated within a carrier BWP. In addition, the BWP may be associated with one numerology, be comprised of a contiguous subset of the common resource blocks, and be dynamically activated over time. The user equipment is provided with up to four BWPs in each of an uplink and a downlink, and transmits and receives data using an activated BWP at a given time.

In the case of a paired spectrum, the uplink and downlink BWPs are configured independently. In the case of an unpaired spectrum, the uplink BWP and the downlink BWP are configured in pairs such that the center frequency may be shared therebetween in order to prevent unnecessary frequency re-tuning between downlink and uplink operations.

In NR, the user equipment performs cell search and random access procedures to access a base station and performs communications with the base station.

The NR cell search procedure is a procedure of synchronizing the user equipment with the cell of a corresponding base station using a synchronization signal block (SSB) transmitted from the base station, acquiring a physical layer cell identifier (ID), and acquiring system information.

Figure 5:
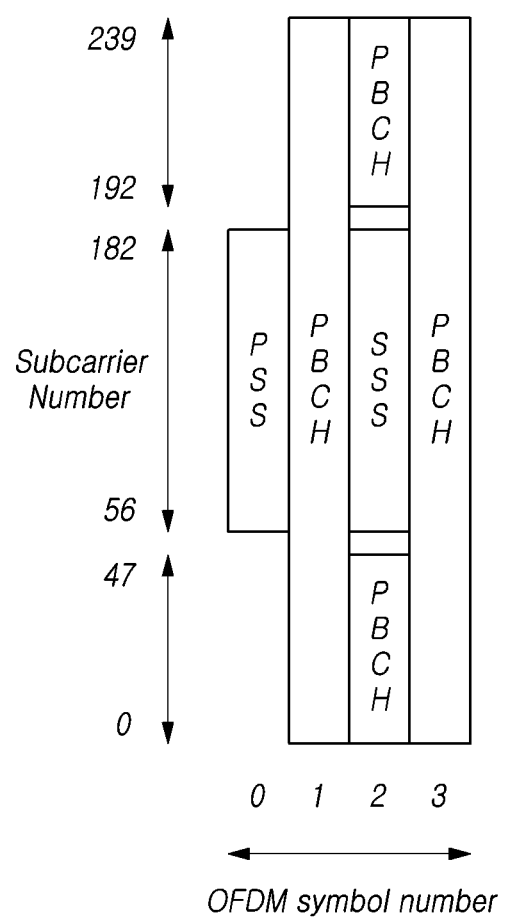
FIG. 5 is a diagram illustrating an example synchronization signal block in wireless access technology related to embodiments of the present disclosure.

FIG. 5 is a diagram illustrating an example synchronization signal block in wireless access technology to which embodiments of the present disclosure are applicable.

Referring to FIG. 5, an SSB includes a primary synchronization signal (PSS) and a secondary synchronization signal (SSS), each of which occupies one symbol and 127 subcarriers, and a physical broadcast channel (PBCH) covering three OFDM symbols and 240 subcarriers.

The user equipment receives the SSB by monitoring the SSB in time and frequency domains.

The SSB may be transmitted up to 64 times for 5 ms. A plurality of SSBs are transmitted on different transmission beams within a period of 5 ms, and the user equipment performs detection on the assumption that an SSB is transmitted at every 20 ms period, on the basis of a specific beam used for transmission. The number of beams that may be used for the SSB transmission within the 5 ms period may increase with increases in the frequency band. For example, up to four SSB beams may be transmitted in a frequency band of 3 GHz or lower. SSB may be transmitted using up to eight beams in a frequency band of 3 to 6 GHz and up to 64 different beams in a frequency band of 6 GHz or higher.

Two SSBs are included in one slot, and the start symbol and the number of repetitions in the slot are determined depending on the subcarrier spacing as will be described below.

In addition, unlike an SS of related-art LTE, the SSB is not transmitted at the center frequency of a carrier bandwidth. That is, the SSB may be transmitted on a frequency that is not the center frequency of a system band, and a plurality of SSBs may be transmitted in a frequency domain when a wideband operation is supported. Thus, the user equipment monitors the SSBs using a synchronization raster that is a candidate frequency position for the monitoring of the SSBs. A carrier raster and the synchronous raster, which are center frequency position information of a channel for initial access, are newly defined in NR. The synchronous raster is configured to have a wider frequency interval than the carrier raster, and thus, may support the user equipment for rapid SSB search.

The user equipment may acquire a master information block (MIB) through the PBCH of the SSB. The MIB includes minimum information by which the user equipment receives remaining minimum system information (RMSI) broadcast by the network. In addition, the PBCH may include information regarding the position of a first demodulation reference signal (DM-RS) symbol in the time domain, information (e.g. system information block 1 (SIB1) numerology information, information regarding an SIB1 control resource set (SIB1 CORESET), search space information, or PDCCH related parameter information) by which the user equipment monitors SIB1, information regarding an offset between a common resource block and an SSB (where the absolute position of the SSB in the carrier is transmitted via SIB1), and the like. Here, the SIB1 numerology information is equally applied to messages 2 and 4 of a random access procedure for accessing a base station after the user equipment has completed the cell search procedure.

The above-described RMSI refers to system information block 1 (SIB1), which is periodically broadcast (e.g. at 160 ms) in the cell. SIB1 includes information necessary for the user equipment to perform an initial random access procedure and is periodically transmitted through the PDSCH. In order for the user equipment to receive SIB1, the user equipment is required to receive numerology information, which is used for SIB1 transmission, and control resource set (CORESET) information, which is used for SIB1 scheduling, through the PBCH. The user equipment checks scheduling information regarding SIB1 using a system information radio network temporary identifier (SI-RNTI) in the CORESET, and acquires SIB1 on the PDSCH according to the scheduling information. The remaining SIBs other than SIB1 may be periodically transmitted or may be transmitted at the request of the user equipment.

Figure 6:
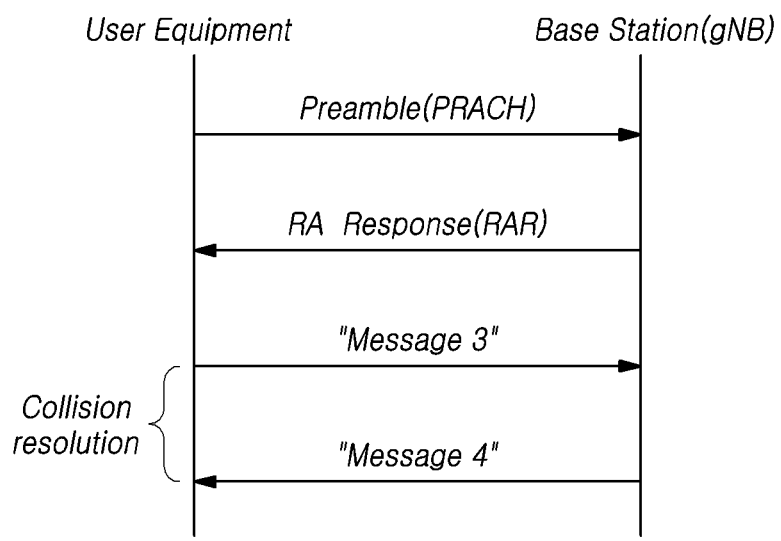
FIG. 6 is a diagram illustrating a random access procedure in wireless access technology related to embodiments of the present disclosure.

FIG. 6 is a diagram illustrating a random access procedure in wireless access technology to which embodiments of the present disclosure are applicable.

Referring to FIG. 6, when cell search is completed, the user equipment transmits a random access preamble, in use for random access, to the base station. The random access preamble is transmitted through a physical random access channel (PRACH). Specifically, the random access preamble is transmitted to the base station through the PRACH comprised of consecutive radio resources in a specific slot periodically repeated. In general, a contention-based random access procedure is performed when user equipment initially accesses a cell, whereas a non-contention based random access procedure is performed when random access is performed for beam failure recovery (BFR).

The user equipment receives a random access response to the transmitted random access preamble. The random access response may include a random access preamble identifier (ID), an uplink (UL) radio resource grant, a temporary cell radio network temporary ID (temporary C-RNTI), and a time alignment command (TAc). Since one random access response may include random access response information regarding one or more sets of user equipment, the random access preamble ID may be included to order to indicate to which user equipment the included UL grant, the temporary C-RNTI, and the TAC are valid. The random access preamble ID may be an ID of the random access preamble that the base station has received. The TAC may be included as information by which the user equipment adjusts uplink synchronization. The random access response may be indicated by a random access ID on the PDCCH, i.e., a random access-radio network temporary ID (RA-RNTI).

When the valid random access response is received, the user equipment processes information included in the random access response and performs a scheduled transmission to the base station. For example, the user equipment applies the TAC and stores the temporary C-RNTI. In addition, the user equipment transmits data stored in a buffer or newly generated data to the base station, using the UL grant. In this case, information by which the user equipment may be identified must be included.

Finally, the RA-RNTI receives a downlink message for contention resolution.

In NR, a downlink control channel is transmitted on a control resource set (CORESET) having a length of 1 to 3 symbols. Up/down scheduling information, slot format index (SFI) information, transmit power control information, and the like are transmitted through the downlink control channel.

Thus, in NR, in order to secure the flexibility of the system, the CORESET is introduced. The control resource set (CORESET) refers to a time-frequency resource for a downlink control signal. The user equipment may decode a control channel candidate using one or more search spaces in a CORESET time-frequency resource. Quasi colocation (QCL) assumption is established according to the CORESET. The QCL assumption is used in order to inform the characteristics of analogue beam directions in addition to characteristics assumed by related-art QCL, such as a delayed spread, a Doppler spread, a Doppler shift, or an average delay.

Figure 7:
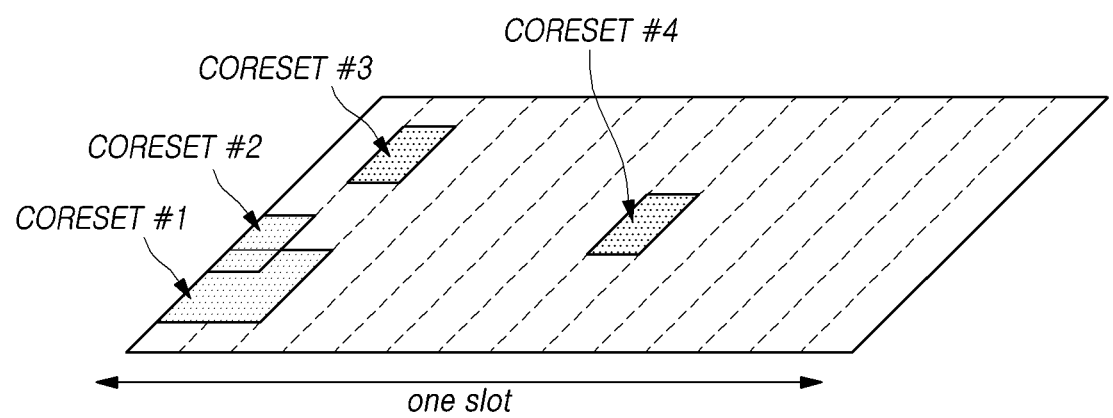
FIG. 7 is a diagram illustrating a CORESET related to embodiments of the present disclosure.

FIG. 7 is a diagram illustrating a CORESET.

Referring to FIG. 7, the CORESET may have a variety of forms within a carrier bandwidth in a single slot. The CORESET may be comprised of up to three OFDM symbols in the time domain. In addition, the CORESET is defined as a multiple of six resource blocks up to the carrier bandwidth in the frequency domain.

The first CORESET is a portion of an initial BWP configuration, indicated through the MIB so as to be able to receive additional configuration information and system information from the network. After a connection to the base station is established, the user equipment may receive and configure one or more pieces of CORESET information through RRC signaling.

Herein, the terms, such as frequency, frame, subframe, resource, resource block, region, band, sub-band, control channel, data channel, synchronization signal, various reference signals, various signals, or various messages, related to new radio access technology (NR) may be interpreted as having a variety of concepts used in the past or present or to be used in the future.

Enhanced mobile broadband (eMBB), massive machine type communications (mMTC), and ultra-reliable and low-latency communications (URLLC) are defined as major NR usage scenarios. As a method for meeting requirements according to usage scenarios, a frame structure design flexible compared to LTE/LTE-Advanced is required.

Respective usage scenarios have different requirements for data rates, latency, reliability, coverage, and the like. Thus, as a method for efficiently meeting requirements according to usage scenarios through frequency bands of any NR system, the necessity of a method of efficiently multiplexing radio resource units based on different numerologies (e.g. subcarrier spacing, subframe, and transmission time interval (TTI)) has arisen.

As a solution to the above necessity, there have been discussions on a method of multiplexing and supporting numerologies having different subcarrier spacing (SCS) values, on the basis of TDM, FDM, or TDM/FDM, through a single NR component carrier or a plurality of NR component carriers and a method of supporting one or more time units when configuring a scheduling unit in the time domain. In this regard, in NR, the subframe has been defined as a type of time domain structure. In addition, there was a decision to define, a single subframe duration including 14 OFDM symbols of the normal CP overhead based on 15 kHz-subcarrier spacing (SCS) as a reference numerology for defining a corresponding subframe duration, in the same manner as in LTE. Accordingly, the subframe in NR has a time duration of 1 ms. However, unlike LTE, a slot and a mini-slot may be defined as a time unit, on which actual uplink/downlink data scheduling is based, for the absolute reference time duration in the subframe of NR. In this case, in the case of the normal CP, the number of OFDM symbols, i.e. a y value, of the corresponding slot is determined to have a value of y=14 irrespective of the SCS value.

In addition, a mini-slot comprised of fewer symbols than the slot may be defined in any numerology (or SCS), such that a shorter time domain scheduling spacing for uplink/downlink data transmission/reception may be configured on the basis of the mini-slot, or a longer time domain scheduling spacing for uplink/downlink data transmission/reception may be configured by slot aggregation. In particular, in the case of transmission/reception of latency-critical data, such as the URLLC, it may be difficult to meet latency requirements when scheduling is performed on the basis of a slot having 1 ms (14 symbols) defined in a frame structure based on a numerology having a small SCS value, e.g. 15 kHz. To solve this problem, definition may be made on a mini-slot comprised of fewer OFDM symbols than the slot, so that latency-critical data as in the URLLC may be scheduled on the basis of the mini-slot.

Further, there has been considered a method of multiplexing and supporting numerologies having different SCS values in a single NR carrier using a TDM or FDM technique, as described above, thereby scheduling data according to latency requirements based on the slot length (or mini-slot length) defined according to the numerology. For example, the symbol length of 60 kHz SCS illustrated in FIG. 2 above is reduced to be about one fourth of the symbol length of 15 kHz SCS. Thus, when a single slot is comprised of 14 OFDM symbols in both cases, the slot length based on the 15 kHz SCS is 1 ms, but the slot length based on the 60 kHz SCS is reduced to be about 0.25 ms. In this manner, NR may meet both URLLC requirements and eMBB requirements by defining different SCSs or different TTI lengths.

Figure 8:
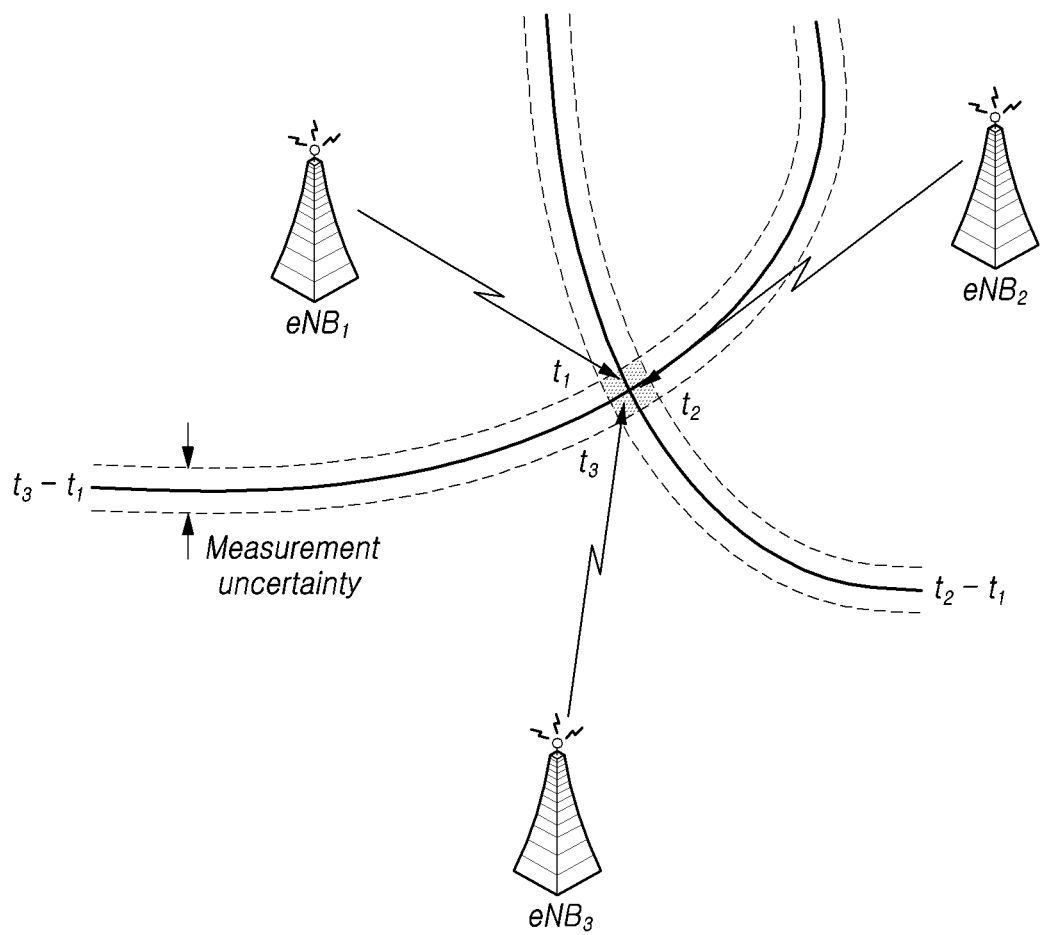
FIG. 8 is a diagram illustrating OTDOA-based positioning related to embodiments of the present disclosure.

As a fundamental principle of positioning the user equipment, the observed time difference of arrival (OTDOA) method of estimating a reference signal time difference (RSTD), i.e. a reception signal time difference, is representative. As a fundamental principle, as illustrated in FIG. 8, the user equipment is positioned by estimating an intersecting region on the basis of time differences obtained from three or more cells. Regarding the positioning reference signal (hereinafter, referred to as the "PRS"), the user equipment may be configured as having information regarding the transmission of the PRS for up to 24×3 (3-sector) cells by higher layer signaling.

In addition, the user equipment must report RSTD values estimated from the respective cells to the base station. Table 2 below illustrates values used to report time difference values estimated by the user equipment.

Fundamentally, the reporting range is defined as ranging from $-15391T_s$ to $15391T_3$. Up to $-4096$ $T_s$ RSTD≤4096≤$T_s$, the resolution is 1 $T_s$. The resolution of the remaining range is 5 $T_s$.

TABLE 2

RSTD Report Mapping

| Reported Value | Measured Quantity Value | Unit |
| --- | --- | --- |
| RSTD_0000 | −15391 > RSTD | $T_s$ |
| RSTD_0001 | −15391 ≤ RSTD < −15386 | $T_s$ |
| ... | ... | ... |
| RSTD_2258 | −4106 ≤ RSTD < −4101 | $T_s$ |
| RSTD_2259 | −4101 ≤ RSTD < −4096 | $T_s$ |
| RSTD_2260 | −4096 ≤ RSTD < −4095 | $T_s$ |
| RSTD_2261 | −4095 ≤ RSTD < −4094 | $T_s$ |
| ... | ... | ... |
| RSTD_6353 | −3 ≤ RSTD < −2 | $T_s$ |
| RSTD_6354 | −2 ≤ RSTD < −1 | $T_s$ |
| RSTD_6355 | −1 ≤ RSTD < 0 | $T_s$ |
| RSTD_6356 | 0 < RSTD ≤ 1 | $T_s$ |
| RSTD_6357 | 1 < RSTD ≤ 2 | $T_s$ |
| RSTD_6358 | 2 < RSTD ≤ 3 | $T_s$ |
| ... | ... | ... |
| RSTD_10450 | 4094 < RSTD ≤ 4095 | $T_s$ |
| RSTD_10451 | 4095 < RSTD ≤ 4096 | $T_s$ |
| RSTD_10452 | 4096 < RSTD ≤ 4101 | $T_s$ |
| RSTD_10453 | 4101 < RSTD ≤ 4106 | $T_s$ |
| ... | ... | ... |
| RSTD_12709 | 15381 < RSTD ≤ 15386 | $T_s$ |

TABLE 2-continued

RSTD Report Mapping

| Reported Value | Measured Quantity Value | Unit |
|---|---|---|
| RSTD_12710 | 15386 < RSTD ≤ 15391 | $T_s$ |
| RSTD_12711 | 1539 < RSTD | $T_s$ |

Reporting on high resolution is additionally included in the standards, and the corresponding features are as described in Table 3 below. These values may be transmitted along with the RSTD estimated in advance. In 2260 $T_s$≤RSTD≤10451 $T_s$, reporting using RSTD_delta_0 and RSTD_delta_1 may be enabled. In 0000$T_s$≤RSTD≤2259 $T_s$ range and 10452 $T_s$≤RSTD≤12711 $T_s$ range, any value except for RSTD_delta_1 may be used. For reference, 1 $T_s$ indicates about 9.8 m. Using 15 kHz subcarrier spacing of LTE, calculation was performed as follows.

SCS=15 kHz, Reference OFDM symbol length=66.7 us
A time axis 2048 sample produced on the basis of 2048FFT (oversampling not applied)
Length per sample on the time axis (=1$T_s$)=66.7 us/2048 samples in time X (3×108 m/s)=9.8 m

TABLE 3

Relative Quantity Mapping for Higher-Resolution RSTD Measurement Reporting

| Reported Relative Quantity Mapping | Measured Relative Quantity Value, $\Delta_{RSTD}$ | Unit |
|---|---|---|
| RSTD_delta_0 | 0 | $T_s$ |
| RSTD_delta_1 | 0.5 | $T_s$ |
| RSTD_delta_2 | 1.0 | $T_s$ |
| RSTD_delta_3 | 2.0 | $T_s$ |
| RSTD_delta_4 | 3.0 | $T_s$ |
| RSTD_delta_5 | 4.0 | $T_s$ |

A PRS design able to support a variety of use cases and high resolution considered in NR positioning has not been introduced until now. The present disclosure introduces a PRS configuring method for 5G NR. Hereinafter, a method of designing a PRS transmission pattern and a signaling method that are able to specifically meet a variety of use cases and high requirements will be described with reference to the drawings.

Figure 9:
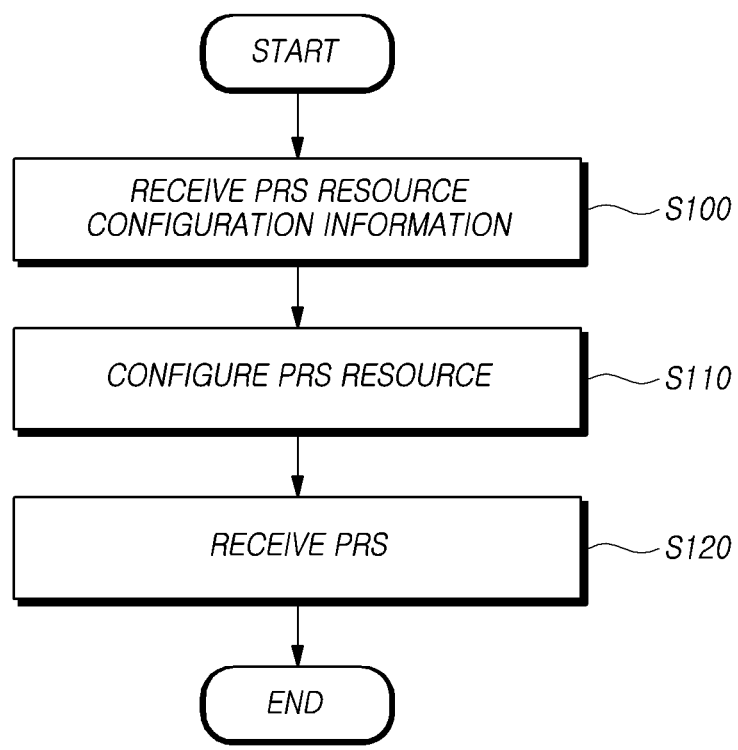
FIG. 9 is a diagram illustrating a positioning procedure of user equipment according to an embodiment of the present disclosure.
Figure 10:
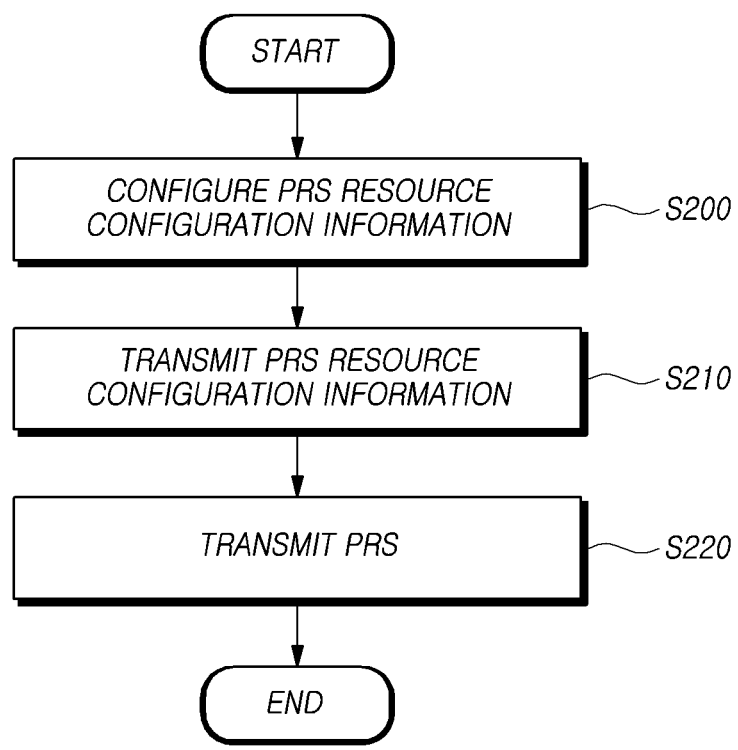
FIG. 10 is a diagram illustrating a PRS transmitting procedure of a base station according to an embodiment of the present disclosure.

FIG. 9 is a diagram illustrating a positioning procedure of user equipment according to an embodiment. FIG. 10 is a diagram illustrating a PRS transmitting procedure of a base station according to an embodiment of the present disclosure. FIGS. 11 to 14 are diagrams illustrating PRS transmission patterns according to embodiments of the present disclosure.

Referring to FIG. 9, in S100, the user equipment may receive configuration information regarding a PRS resource (hereinafter, referred to as PRS resource configuration information) used in the reception of a positioning reference signal (PRS) from the base station.

The PRS resource, i.e. a radio resource, used for transmitting the PRS for positioning the user equipment may be flexibly configured so as to comply with a variety of scenarios of use. That is, the PRS may be transmitted in a variety of patterns on the radio resource according to use cases of the user equipment.

In an example, the PRS resource configuration information may be received from the base station by higher layer signaling. That is, parameters of the PRS resource may be configured as higher layer parameters.

The PRS resource configuration information may include at least one of information regarding a PRS ID for at least one PRS resource, information regarding a PRS sequence (or PRS sequence information), information regarding frequency domain allocation (or frequency domain allocation information), information regarding time domain allocation (or time domain allocation information), and information regarding a comb size (or comb size information).

One or more PRS resources may be used by the base station when transmitting the PRS. In an example, one or more PRS resources may form a PRS resource set. In addition, one or more PRS resource sets may be used when transmitting the PRS. In this case, an ID may be assigned to each of PRS resources and PRS resource sets in order to identify the PRS resources and the PRS resource sets. In addition, the number of PRS resources of each of PRS resource sets may be included in the PRS resource configuration information. The PRS resource sets may be matched to beams, respectively, in a multiplexing mode.

The PRS sequence information may be information used to map the PRS to the PRS resource. In an example, the PRS sequence may be a pseudo-random sequence, i.e. a sequence having a quasi-orthogonal characteristic. That is, the PRS sequence overlapping in the code may be separated using the orthogonal characteristic. In addition, the PRS resource configuration information may include a PRS sequence ID identifying the PRS sequence used for the mapping of the PRS.

The PRS resource configuration information may include time domain allocation information for the PRS resource. The time domain allocation information may include information regarding an index of a symbol, at which the PRS starts, in the PRS resource and the size of N number of consecutive symbols in which the PRS is configured.

In this regard, the configuration information may include offset information regarding a slot in which the PRS resource starts, with respect to an initial slot in an initial subframe having subframe number 0 (SFN0) of a one-cycle radio frame of a serving cell of the user equipment. In addition, the configuration information may include information regarding a start symbol, at which the PRS starts to be transmitted, in the slot in which the PRS resource starts. In an example, in the case of the normal CP, the start symbol may be configured as one of 14 symbols included in a single slot. That is, one symbol among symbol 0 to symbol 13 may be configured as the start symbol.

In addition, the PRS may be mapped to N number of consecutive symbols in a single slot of the PRS resource. In an example, the number N of the consecutive symbols may be set to be one value among 2, 4, 6, and 12. For example, when the start symbols is symbol 2 and N is set to be 2, the PRS may be transmitted for symbol 2 and symbol 3 in the corresponding symbols.

The PRS resource configuration information may include frequency domain allocation information regarding the PRS resource. The frequency domain allocation information may include information regarding an index of a physical resource block (PRB) in which the PRS resource starts within a system bandwidth configured for the user equipment and the number of resource blocks allocated to the PRS resource.

In this regard, the configuration information may include offset information regarding a subcarrier in which the PRS resource starts, with respect to a subcarrier having a lowest index among the subcarriers of a frequency bandwidth allocated to the reception of the PRS, within a system bandwidth configured for the serving cell of the user equipment.

In addition, the PRS resource configuration information may include the comb size information. The comb size information is information regarding the pattern of the frequency domain in which the PRS is configured, with respect to the symbols in the PRS resource. In an example, when 12 resource elements are allocated to the transmission of the PRS for a single slot, the comb size may be set to be one value among 2, 4, 6, and 12. For example, when the comb size is set to be 2, a single PRS may be configured in every second subcarrier for each symbol.

Figure 11:
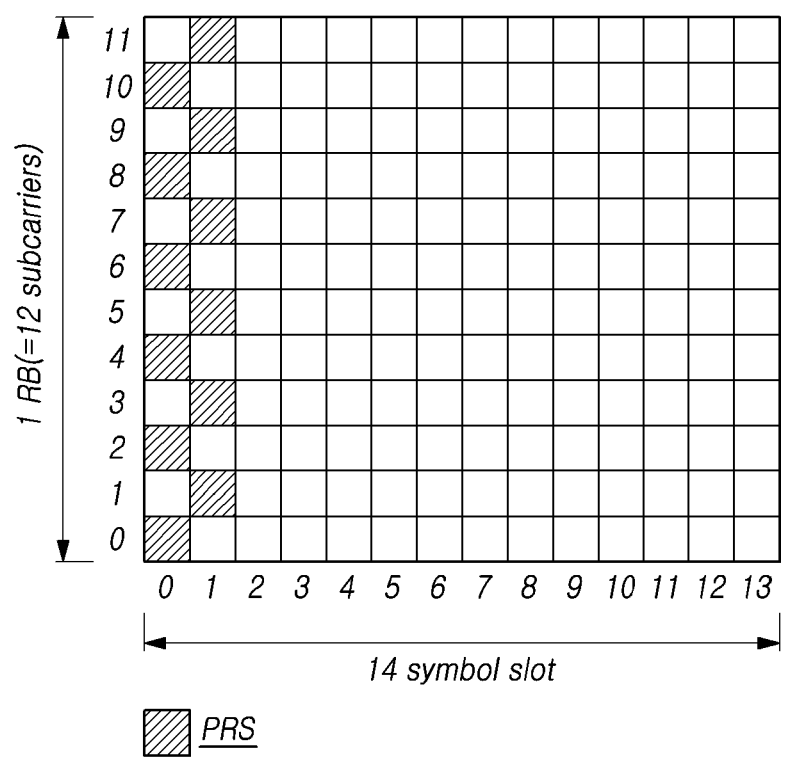
FIGS. 11 to 14 are diagrams illustrating PRS transmission patterns according to embodiments of the present disclosure.

Referring to FIG. 11, an example of the PRS transmission pattern in the radio resource allocated to the PRS is illustrated. In the radio resource grid illustrated in FIG. 11, the horizontal axis is a time domain indicating 14 symbols of a single slot, whereas the vertical axis is a frequency domain indicating 12 subcarriers of a single resource block.

FIG. 11 illustrates a case in which the value of the comb size of the PRS resource is set to be 2. That is, a single PRS is mapped to every second subcarrier, such that six resource elements may be allocated to a single symbol. Since 12 resource elements are allocated to the single slot, the number of consecutive symbols may be set to be 2. Since accuracy decreases when the PRS does not occupy all of the subcarriers in the resource blocks, the subcarriers occupied by the PRS in symbol 0 and the subcarriers occupied by the PRS in symbol 1 may be configured in a zigzag pattern, as illustrated in FIG. 11, in order to occupy all of the subcarriers in the resource blocks.

In addition, although the PRS is illustrated in FIG. 11 as being mapped from subcarrier 0 in the case of symbol 0, the present disclosure is not limited thereto. That is, differently from FIG. 11, the PRS may be mapped from subcarrier 1 in the case of symbol 0 and from subcarrier 0 in the case of symbol 1.

In addition, although the PRS is illustrated in FIG. 11 as starting from symbol 0 of the slot, this is illustrative only and the present disclosure is not limited thereto. That is, as described above, the start symbol, at which the PRS resource starts, in a single slot may be selected from among a variety of other symbols. For example, when the start symbol is set to be symbol 7, the PRS may be mapped to symbol 7 and symbol 8 in the same pattern as in FIG. 11.

Figure 12:
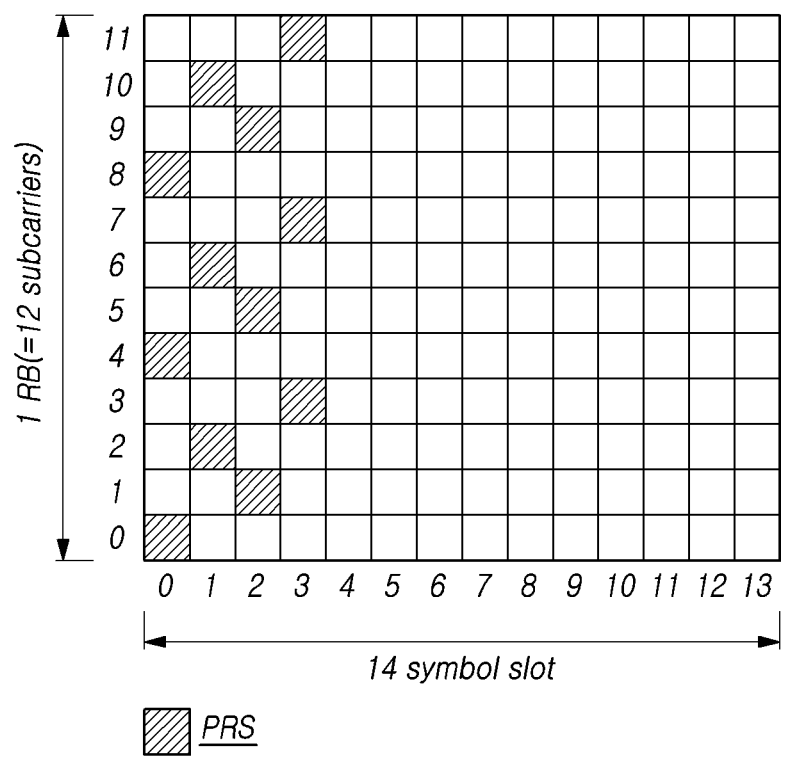

FIG. 12 illustrates a case in which the value of the comb size of the PRS resource is set to be 4. That is, a single PRS is mapped to every fourth subcarrier, such that three resource elements may be allocated to a single symbol. Since 12 resource elements are allocated to the single slot, the number of consecutive symbols may be set to be 4. In the same manner, the pattern may be configured such that all of the subcarriers in the resource block are occupied.

In an example, the PRS resource configuration information may include information regarding the sequence of the subcarriers allocated with respect to the four consecutive symbols. That is, a symbol index and a subcarrier index of each resource element to which the PRS is mapped may be indicated by the configuration information. That is, when the symbol index of a resource element is 1 and the subcarrier index of the resource element is k, a value (k, l) may be indicated by the configuration information. For example, in the case of FIG. 12, the resource elements may be sequentially indicated from the lowest resource element (0, 0) through (1, 2), (2, 1), and (3, 3).

However, this is illustrative only and the present disclosure is not limited thereto. As long as all of the subcarriers may be occupied depending on the comb size and the number of the symbols configured, the PRS may be mapped in any other pattern. For example, the resource elements may be indicated in the sequence of (0,0), (1,1), (2,2), and (3, 3) in a stepwise manner.

In addition, although the PRS is illustrated in FIG. 12 as being mapped from subcarrier 0 in the case of symbol 0, the present disclosure is not limited thereto. Likewise, although the PRS is illustrated as starting from symbol 0 of the slot, this is illustrative only and the present disclosure is not limited thereto.

Figure 13:
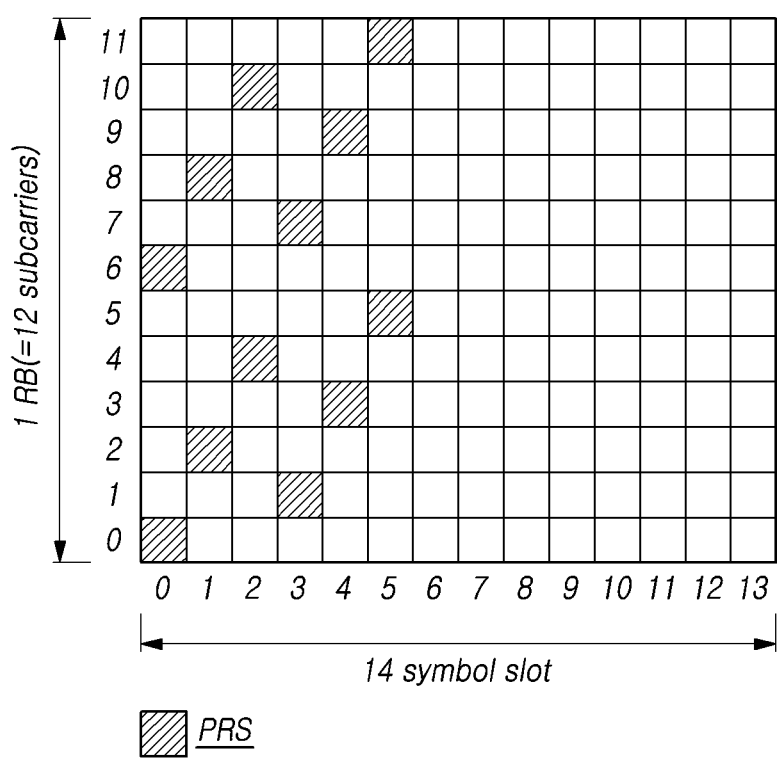

FIG. 13 illustrates a case in which the value of the comb size of the PRS resource is set to be 6. That is, a single PRS is mapped to every sixth subcarrier, such that two resource elements may be allocated to a single symbol. Since 12 resource elements are allocated to the single slot, the number of consecutive symbols may be set to be 6. In the same manner, the pattern may be configured such that all of the subcarriers in the resource block are occupied.

The description of FIG. 12 may be equally applied to this case, specific descriptions will be omitted in order to avoid repeated description.

Figure 14:
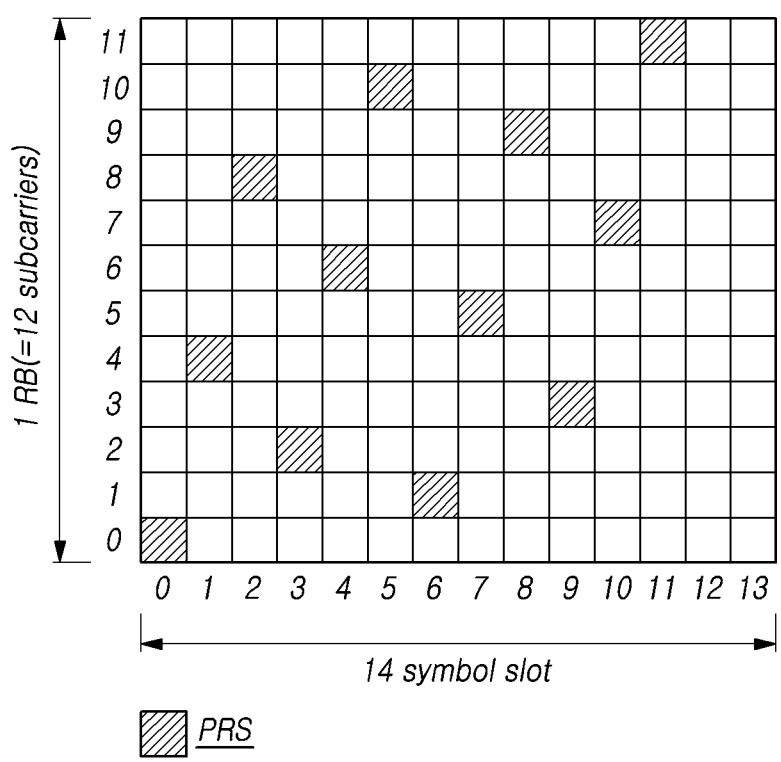

FIG. 14 illustrates a case in which the value of the comb size of the PRS resource is set to be 12. That is, a single PRS is mapped to every twelfth subcarrier, such that one resource elements may be allocated to a single symbol. Since 12 resource elements are allocated to the single slot, the number of consecutive symbols may be set to be 12. In the same manner, the pattern may be configured such that all of the subcarriers in the resource block are occupied.

Likewise, the description of FIG. 12 may be equally applied to this case, specific descriptions will be omitted in order to avoid repeated description.

In an example, the PRS resource configuration information may further include information configured for the PRS resource, such as subcarrier spacing information, cyclic prefix information, and information regarding the lowest subcarrier in a frequency band allocated to the reception of the PRS. PRS resources included in a single PRS resource set may be configured so as to have the same subcarrier spacing, the same cyclic prefix, and the same value for the subcarrier of the lowest index.

In an example, the subcarrier spacing information and the cyclic prefix information may be configured to have one among the values described in Table 1 above.

In an example, the PRS may be periodically transmitted. In this case, the PRS resource configuration information may include period information of the PRS resource set. The period information may be configured on the basis of the value of the subcarrier spacing. For example, the period information may be set to be one from among $2^\mu \times \{4, 8, 16, 32, 64, 5, 10, 20, 40, 80, 160, 320, 640, 1280, 2560, 5120, 10240, 20480\}$ number of slot values. Here, $\mu$ is a value used in Table 1.

In addition, the PRS resource configuration information may further include information regarding the number of repetitions of the PRS resource within a single PRS resource set. In this case, the configuration information may also include an offset value between the repetitions of the PRS resource.

Returning to FIG. 9, the user equipment may configure the PRS resource for the user equipment on the basis of the configuration information in S110 and receive the PRS from the base station via the PRS resource in S120.

The user equipment may configure the PRS resource to receive the PRS according to the received PRS resource configuration information. The user equipment may receive the PRS by monitoring the configured PRS resource.

In an example, the user equipment may assume that the PRS is not mapped to any symbol including at least one of a synchronization signal and physical broadcast channel (SS/PBCH). When a time and a frequency position at which the SS/PBCH block is transmitted from each of non-serving cells, the user equipment may also assume that the PRS is not mapped to any symbol including the SS/PBCH block of the non-serving cell.

In an example, the user equipment may receive the PRS from each of the serving cell and two or more adjacent cells for the purpose of the positioning of the user equipment. The user equipment may measure RSTD between the received PRSs.

Alternatively, the user equipment may measure the reference signal received power (RSRP) of the received PRSs. Alternatively, the user equipment may measure a time difference from the transmission to the reception of the received PRS.

The user equipment may report information regarding the RSTD and the RSRP measured or the time difference from the transmission to the reception to the base station. In this case, the user equipment may report both a PRS resource ID of a PRS resource, from which the PRS used for the measurement of the reported information is received, and a PRS resource set ID of a PRS resource set including the corresponding PRS resource.

The base station may estimate an intersecting region on the basis of the RSTD information and the like. Accordingly, the position of the user equipment may be estimated.

As described above, in NR, the specific method and device able to flexibly configure the PRS resource used for transmitting and receiving the PRS may be provided.

Hereinafter, a method of transmitting the PRS by the base station will be described with reference to FIG. 10.

Referring to FIG. 10, the base station may configure PRS resource configuration information used in the transmission of the PRS in S200.

In an example, the base station may transmit the PRS resource configuration information to the user equipment by higher layer signaling. That is, parameters for forming the PRS resource may be configured as higher layer parameters.

The PRS resource configuration information may include information regarding a PRS ID for at least one PRS resource, PRS sequence information, frequency domain allocation information, time domain allocation information, and comb size information.

One or more PRS resources may be used when the base station transmits the PRS. In an example, one or more PRS resources may form a PRS resource set. In addition, one or more PRS resource sets may be used for transmitting the PRS. In this case, an ID may be assigned to each of PRS resources and PRS resource sets in order to identify the PRS resources and the PRS resource sets.

The PRS sequence information may be information used to map the PRS to the PRS resource. In addition, the PRS resource configuration information may include a PRS sequence ID identifying the PRS sequence used for the mapping of the PRS.

The time domain allocation information may include information regarding an index of a symbol, at which the PRS starts, in the PRS resource and the size of N number of consecutive symbols in which the PRS is configured.

In this regard, the configuration information may include offset information regarding a slot in which the PRS resource starts, with respect to an initial slot in an initial subframe having subframe number 0 (SFN0) of a one-cycle radio frame of a serving cell of the user equipment. In addition, the configuration information may include information regarding a start symbol, at which the PRS starts to be transmitted, in the slot in which the PRS resource starts.

In addition, the PRS may be mapped to N number of consecutive symbols in a single slot of the PRS resource. In an example, the number N of the consecutive symbols may be set to be one value among 2, 4, 6, and 12.

The frequency domain allocation information may include information regarding an index of a PRB in which the PRS resource starts within a system bandwidth configured for the user equipment and the number of resource blocks allocated to the PRS resource.

In this regard, the configuration information may include offset information regarding a subcarrier in which the PRS resource starts, with respect to a subcarrier having a lowest index among the subcarriers of a frequency bandwidth allocated to the reception of the PRS, within a system bandwidth configured for the serving cell of the user equipment.

In addition, the PRS resource configuration information may include the comb size information. The comb size information is information regarding the pattern of the frequency domain in which the PRS is configured, with respect to the symbols in the PRS resource. In an example, when 12 resource elements are allocated to the transmission of the PRS for a single slot, the comb size may be set to be one value among 2, 4, 6, and 12.

In an example, the PRS resource configuration information may further include information configured for the PRS resource, such as subcarrier spacing information, cyclic prefix information, and information regarding the lowest subcarrier in a frequency band allocated to the reception of the PRS. PRS resources included in a single PRS resource set may be configured so as to have the same subcarrier spacing, the same cyclic prefix, and the same value for the subcarrier of the lowest index.

In an example, the PRS may be periodically transmitted. In this case, the PRS resource configuration information may include period information of the PRS resource set. The period information may be configured on the basis of the value of the subcarrier spacing. For example, the period information may be set to be one from among $2^\mu X\{4, 8, 16, 32, 64, 5, 10, 20, 40, 80, 160, 320, 640, 1280, 2560, 5120, 10240, 20480\}$ number of slot values. Here, $\mu$ is a value used in Table 1.

In addition, the PRS resource configuration information may further include information regarding the number of repetitions of the PRS resource within a single PRS resource set. In this case, the configuration information may also include an offset value between the repetitions of the PRS resource.

NM Returning to FIG. 10, the base station may transmit the PRS resource configuration information to the user equipment in S210 and transmit the PRS to the user equipment via the PRS resource in S220.

The base station may transmit the configuration information regarding the configured PRS resource. When the PRS is transmitted through the corresponding PRS resource, the user equipment may receive the PRS by monitoring the configured PRS resource.

In an example, the user equipment may receive the PRS from each of the serving cell and two or more adjacent cells for the purpose of the positioning of the user equipment. The user equipment may measure RSTD between the received PRSs.

Alternatively, the user equipment may measure the RSRP of the received PRSs. Alternatively, the user equipment may measure a time difference from the transmission to the reception of the received PRS.

The user equipment may report information regarding the RSTD and the RSRP measured or the time difference from the transmission to the reception to the base station. In this case, the user equipment may report both a PRS resource ID of a PRS resource, from which the PRS used for the measurement of the reported information is received, and a PRS resource set ID of a PRS resource set including the corresponding PRS resource.

The base station may estimate an intersecting region on the basis of the RSTD information and the like. Accordingly, the position of the user equipment may be estimated.

As described above, in NR, the specific method and device able to flexibly configure the PRS resource used for transmitting and receiving the PRS may be provided.

Hereinafter, configurations of the user equipment and the base station able to realize some or all of the embodiments described above with reference to FIGS. 1 to 14 will be described with reference to the drawings.

Figure 15:
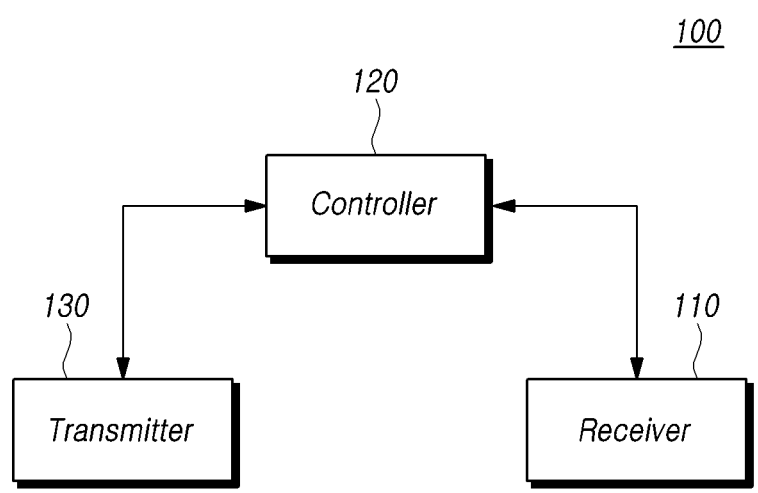
FIG. 15 is a diagram illustrating a configuration of user equipment (UE) according to an embodiment of the present disclosure.

FIG. 15 is a diagram illustrating a configuration of user equipment 100 according to an embodiment of the present disclosure.

Referring to FIG. 15, the user equipment 100 according to the embodiment includes a receiver 110, a controller 120, and a transmitter 130.

The controller 120 controls the overall operation of the user equipment 100 according to the method of receiving, by the user equipment, a PRS, required for the realization of the present disclosure. The transmitter 130 transmits uplink control information and data, messages, and the like to the base station through a corresponding channel. The receiver 110 receives downlink control information and data, messages, and the like from the base station through a corresponding channel.

The receiver 110 may receive configuration information regarding PRS resources used for receiving the PRS from the base station.

In an example, the receiver 110 may receive PRS resource configuration information from the base station by higher layer signaling. That is, parameters for forming the PRS resource may be configured as higher layer parameters.

The PRS resource configuration information may include information regarding a PRS ID for at least one PRS resource, PRS sequence information, frequency domain allocation information, time domain allocation information, and comb size information.

One or more PRS resources may be used by the base station when transmitting the PRS. In an example, one or more PRS resources may form a PRS resource set. In addition, one or more PRS resource sets may be used when transmitting the PRS. In this case, an ID may be assigned to each of PRS resources and PRS resource sets in order to identify the PRS resources and the PRS resource sets.

The PRS sequence information may be information used to map the PRS to the PRS resource. The PRS resource configuration information may include a PRS sequence ID identifying the PRS sequence used for the mapping of the PRS.

The PRS resource configuration information may include time domain allocation information for the PRS resource. The time domain allocation information may include information regarding an index of a symbol, at which the PRS starts, in the PRS resource and the size of N number of consecutive symbols in which the PRS is configured.

In addition, the PRS may be mapped to N number of consecutive symbols in a single slot of the PRS resource. In an example, the number N of the consecutive symbols may be set to be one value among 2, 4, 6, and 12.

The PRS resource configuration information may include frequency domain allocation information regarding the PRS resource.

The frequency domain allocation information may include information regarding an index of a PRB in which the PRS resource starts within a system bandwidth configured for the user equipment and the number of resource blocks allocated to the PRS resource.

In addition, the PRS resource configuration information may include the comb size information. The comb size information is information regarding the pattern of the frequency domain in which the PRS is configured, with respect to the symbols in the PRS resource. In an example, when 12 resource elements are allocated to the transmission of the PRS for a single slot, the comb size may be set to be one value among 2, 4, 6, and 12.

In an example, the PRS resource configuration information may further include information configured for the PRS resource, such as subcarrier spacing information, cyclic prefix information, and information regarding the lowest subcarrier in a frequency band allocated to the reception of the PRS. PRS resources included in a single PRS resource set may be configured so as to have the same subcarrier spacing, the same cyclic prefix, and the same value for the subcarrier of the lowest index.

In an example, the subcarrier spacing information and the cyclic prefix information may be configured to have one among the values described in Table 1 above.

In addition, the PRS resource configuration information may further include information regarding the number of repetitions of the PRS resource within a single PRS resource set. In this case, the configuration information may also include an offset value between the repetitions of the PRS resource.

The controller 120 may configure the PRS resource for the user equipment 100 on the basis of the configuration information. The receiver 110 may receive the PRS from the base station via the PRS resource. The controller 120 may configure the PRS resource in order to receive the PRS according to the received PRS resource configuration information. The receiver 110 may receive the PRS by monitoring the configured PRS resource.

In an example, the receiver 110 may receive the PRS from each of the serving cell and two or more adjacent cells for the purpose of the positioning of the user equipment. The controller 120 may measure RSTD between received PRSs.

Alternatively, the controller 120 may measure the RSRP of the received PRSs. Alternatively, the controller 120 may measure a time difference from the transmission to the reception of the received PRS.

The transmitter 130 may report information regarding the RSTD and the RSRP measured or the time difference from the transmission to the reception to the base station. In this case, the transmitter 130 may report both a PRS resource ID of a PRS resource, from which the PRS used for the measurement of the reported information is received, and a PRS resource set ID of a PRS resource set including the corresponding PRS resource.

The base station may estimate an intersecting region on the basis of the RSTD information and the like. Accordingly, the position of the user equipment may be estimated.

As described above, in NR, the specific method and device able to flexibly configure the PRS resource used for transmitting and receiving the PRS may be provided.

Figure 16:
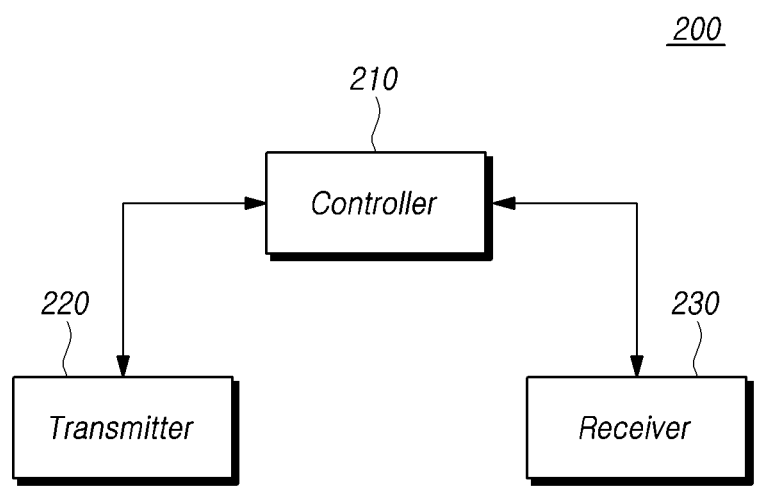
FIG. 16 is a diagram illustrating a configuration of a base station according to an embodiment of the present disclosure.

FIG. 16 is a diagram illustrating a configuration of a base station 200 according to an embodiment of the present disclosure.

Referring to FIG. 16, the base station 200 according to another embodiment includes a controller 210, a transmitter 220, and a receiver 230.

The controller 210 controls the overall operation of the base station 200 according to the method of transmitting, by the base station 200, a PRS, required for the realization of the present disclosure. The transmitter 220 and the receiver 230 are used to transmit signals, messages, or data required for the realization of the present disclosure to the user equipment or receive the same therefrom.

The controller 210 may configure PRS resource configuration information used in the transmission of the PRS.

In an example, the transmitter 220 may transmit the PRS resource configuration information to the user equipment by higher layer signaling. That is, parameters for forming the PRS resource may be configured as higher layer parameters.

The PRS resource configuration information may include information regarding a PRS identifier for at least one PRS resource, PRS sequence information, frequency domain allocation information, time domain allocation information, and comb size information.

One or more PRS resources may be used when the base station transmits the PRS. In an example, one or more PRS resources may form a PRS resource set. In addition, one or more PRS resource sets may be used for transmitting the PRS. In this case, an ID may be assigned to each of PRS resources and PRS resource sets in order to identify the PRS resources and the PRS resource sets.

The PRS sequence information may be information used to map the PRS to the PRS resource. In addition, the PRS resource configuration information may include a PRS sequence ID identifying the PRS sequence used for the mapping of the PRS.

The time domain allocation information may include information regarding an index of a symbol, at which the PRS starts, in the PRS resource and the size of N number of consecutive symbols in which the PRS is configured.

In addition, the PRS may be mapped to N number of consecutive symbols in a single slot of the PRS resource. In an example, the number N of the consecutive symbols may be set to be one value among 2, 4, 6, and 12.

The frequency domain allocation information may include information regarding an index of a PRB in which the PRS resource starts within a system bandwidth configured for the user equipment and the number of resource blocks allocated to the PRS resource.

In addition, the PRS resource configuration information may include the comb size information. The comb size information is information regarding the pattern of the frequency domain in which the PRS is configured, with respect to the symbols in the PRS resource. In an example, when 12 resource elements are allocated to the transmission of the PRS for a single slot, the comb size may be set to be one value among 2, 4, 6, and 12.

In an example, the PRS resource configuration information may further include information configured for the PRS resource, such as subcarrier spacing information, cyclic prefix information, and information regarding the lowest subcarrier in a frequency band allocated to the reception of the PRS. PRS resources included in a single PRS resource set may be configured so as to have the same subcarrier spacing, the same cyclic prefix, and the same value for the subcarrier of the lowest index.

In addition, the PRS resource configuration information may further include information regarding the number of repetitions of the PRS resource within a single PRS resource set. In this case, the configuration information may also include an offset value between the repetitions of the PRS resource.

The transmitter 220 may transmit the PRS resource configuration information to the user equipment and transmit the PRS to the user equipment via the PRS resource.

The transmitter 220 may transmit the configuration information regarding the configured PRS resource. When the PRS is transmitted through the corresponding PRS resource, the user equipment may receive the PRS by monitoring the configured PRS resource.

In an example, the user equipment may receive the PRS from each of the serving cell and two or more adjacent cells for the purpose of the positioning of the user equipment. The user equipment may measure RSTD between received PRSs.

Alternatively, the user equipment may measure the RSRP of the received PRSs. Alternatively, the user equipment may measure a time difference from the transmission to the reception of the received PRS.

The user equipment may report information regarding the RSTD and the RSRP measured or the time difference from the transmission to the reception to the base station. In this case, the user equipment may report both a PRS resource ID of a PRS resource, from which the PRS used for the measurement of the information to be reported is received, and a PRS resource set ID of a PRS resource set including the corresponding PRS resource.

The controller 210 may estimate an intersecting region on the basis of the RSTD information and the like. Accordingly, the position of the user equipment may be estimated.

As described above, in NR, the specific method and device able to flexibly configure the PRS resource used for transmitting and receiving the PRS may be provided.

Embodiments of the present disclosure may be supported by standard documents of at least one of the IEEE 802 system, the 3GPP system, and the 3GPP2 system, all of which are wireless access systems. That is, steps, components, or portions not described in embodiments of the present disclosure for the sake of clearly describing the spirit of the present disclosure may be supported by the standard documents. For all terms used herein, reference may be made to the standard documents.

Embodiments of the present disclosure may be implemented using a variety of means. For example, embodiments of the present disclosure may be implemented using hardware, firmware, software, or any combination thereof.

In the case in which the present disclosure is implemented using hardware, the methods according to embodiments of the present disclosure may be realized using one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case in which the present disclosure is implemented using firmware or software, the methods according to embodiments of the present disclosure may be implemented in the form of devices, processes, functions, or the like performing the functions or operations described above. Software codes may be stored in a memory unit so as to be executed by a processor. The memory unit may be located inside or outside of the processor and may exchange data with the processor via a variety of known means.

The terms, such as "system", "processor", "controller", "component", "module", "interface", "model", or "unit", used herein may generally refer to computer-related entity hardware, a combination of hardware and software, software, or software in execution. For example, the above-described components may be at least one selected from among, but not limited to, a process, a processor, a controller, a control processor, an entity, an execution thread, a program, and a computer. For example, both an application being executed by the controller or processor and the controller or processor may be a component. One or more components may reside in at least one of a process and an execution thread. A component may be located in a single system or may be distributed between two or more systems.

The foregoing descriptions and the accompanying drawings have been presented in order to explain certain principles of the present disclosure by way of example. Those having ordinary knowledge in the technical field to which the present disclosure relates could make various modifications and variations by combining, dividing, substituting for, or changing the elements without departing from the principle of the present disclosure. The foregoing embodiments disclosed herein shall be interpreted as being illustrative, while not being limitative, of the principle and scope of the present disclosure. It should be understood that the scope of the present disclosure shall be defined by the appended Claims and all of their equivalents fall within the scope of the present disclosure.

The invention claimed is:

1. A method of receiving, by user equipment, a positioning reference signal (PRS), the method comprising:
   receiving configuration information regarding a PRS resource, which is used in reception of a PRS, from a base station;
   monitoring the PRS resource for the user equipment in accordance with the configuration information; and
   receiving the PRS from the base station via the PRS resource,
   wherein the configuration information comprises a PRS identifier regarding the PRS resource, a PRS sequence, frequency domain allocation information, time domain allocation information, and information regarding a comb size,
   wherein the time domain allocation information comprises information regarding an index of a start symbol, at which the PRS starts to be transmitted, in a slot in which the PRS resource starts, and a size of N number of consecutive symbols in which the PRS is configured, where N is set to be one from among 2, 4, 6, and 12, and
   wherein the information regarding the comb size comprises pattern information of a frequency domain in which the PRS is configured in the PRS resource, where the comb size is set to be one from among 2, 4, 6, and 12.

2. The method according to claim 1, wherein the configuration information is indicated by higher layer signaling.

3. The method according to claim 1, wherein the configuration information comprises information configured for the PRS resource, including subcarrier spacing information, cyclic prefix information, and information regarding a lowest subcarrier in a frequency band allocated to the reception of the PRS.

4. A method of transmitting, by a base station, a positioning reference signal (PRS), the method comprising:
   configuring configuration information regarding a PRS resource used in transmission of a PRS; and
   transmitting the configuration information regarding the PRS resource to user equipment via the PRS resource,
   wherein the configuration information comprises a PRS identifier regarding the PRS resource, a PRS sequence, frequency domain allocation information, time domain allocation information, and information regarding a comb size,
   wherein the time domain allocation information comprises information regarding an index of a start symbol, at which the PRS starts to be transmitted, in a slot in which the PRS resource starts, and a size of N number of consecutive symbols in which the PRS is configured, where N is set to be one from among 2, 4, 6, and 12, and
   wherein the information regarding the comb size comprises pattern information of a frequency domain in which the PRS is configured in the PRS resource, where the comb size is set to be one from among 2, 4, 6, and 12.

5. The method according to claim 4, wherein the configuration information is indicated by higher layer signaling.

6. The method according to claim 4, wherein the configuration information comprises information configured for the PRS resource, including subcarrier spacing information, cyclic prefix information, and information regarding a lowest subcarrier in a frequency band allocated to the reception of the PRS.

7. User equipment for receiving a positioning reference signal (PRS), the user equipment comprising:
   a receiver configured to receive configuration information regarding a PRS resource, which is used in reception of a PRS, from a base station and receiving the PRS via the PRS resource; and
   a controller configured to monitor the PRS resource regarding the user equipment in accordance with the configuration information,
   wherein the configuration information comprises a PRS identifier regarding the PRS resource, a PRS sequence, frequency domain allocation information, time domain allocation information, and information regarding a comb size,
   wherein the time domain allocation information comprises information regarding an index of a start symbol, at which the PRS starts to be transmitted, in a slot in which the PRS resource starts, and a size of N number of consecutive symbols in which the PRS is configured, where N is set to be one from among 2, 4, 6, and 12, and
   wherein the information regarding the comb size comprises pattern information of a frequency domain in which the PRS is configured in the PRS resource, where the comb size is set to be one from among 2, 4, 6, and 12.

8. The user equipment according to claim 7, wherein the configuration information is indicated by higher layer signaling.

9. The user equipment according to claim 7, wherein the configuration information comprises information configured for the PRS resource, including subcarrier spacing information, cyclic prefix information, and information regarding a lowest subcarrier in a frequency band allocated to the reception of the PRS.

* * * * *